(12) United States Patent
Haner et al.

(10) Patent No.: US 7,821,924 B2
(45) Date of Patent: Oct. 26, 2010

(54) METHOD AND APPARATUS FOR TIMEOUT REDUCTION AND IMPROVED WIRELESS NETWORK PERFORMANCE BY DELAY INJECTION

(75) Inventors: Mark Haner, Westfield, NJ (US); Thierry Etienne Klein, Fanwood, NJ (US); Kin K Leung, London (GB)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 1468 days.

(21) Appl. No.: 11/110,348

(22) Filed: Apr. 20, 2005

(65) Prior Publication Data

US 2006/0104313 A1   May 18, 2006

Related U.S. Application Data

(60) Provisional application No. 60/629,223, filed on Nov. 18, 2004.

(51) Int. Cl.
*H04J 3/06*       (2006.01)
(52) U.S. Cl. .................. 370/229; 370/395.2; 370/517
(58) Field of Classification Search ......... 370/351–352, 370/229, 519
See application file for complete search history.

(56) References Cited

U.S. PATENT DOCUMENTS

| | | | | | |
|---|---|---|---|---|---|
| 6,108,314 | A | * | 8/2000 | Jones et al. ................ | 370/294 |
| 6,131,149 | A | * | 10/2000 | Lu et al. ..................... | 711/167 |
| 6,724,732 | B1 | * | 4/2004 | Abrams et al. .............. | 370/252 |
| 7,054,268 | B1 | * | 5/2006 | Parantainen et al. ........ | 370/231 |
| 7,283,814 | B2 | * | 10/2007 | Klein et al. ................. | 455/419 |
| 2002/0080774 | A1 | * | 6/2002 | Griffith et al. .............. | 370/352 |
| 2002/0146016 | A1 | * | 10/2002 | Liu et al. .................... | 370/401 |
| 2003/0048791 | A1 | * | 3/2003 | De Cnodder et al. ... | 370/395.42 |
| 2003/0053466 | A1 | * | 3/2003 | Bizet et al. .................. | 370/401 |
| 2003/0126282 | A1 | * | 7/2003 | Sarkar et al. ................ | 709/237 |
| 2006/0159057 | A1 | * | 7/2006 | Miyoshi ..................... | 370/346 |

OTHER PUBLICATIONS

Martin, Nilsson, and Rhee, "Delay-Based Congestion Avoidance for TCP", IEEE/ACM Transactions on Networking, vol. 11, No. 3 Jun. 2003, pp. 356-368.*

Allman, M., et al., "On Estimating End-to-End Network Path Properties," Sigcomm '99, Aug. 1999, pp. 263-274, Cambridge, MA, USA.

(Continued)

*Primary Examiner*—Chirag G Shah
*Assistant Examiner*—Salvador E Rivas
(74) *Attorney, Agent, or Firm*—Martin I. Finston (57) ABSTRACT

A technique for avoiding spurious TCP timeouts through delay injection which requires no modification of, or access to, the TCP protocol itself. More particularly, injection of additional random delay or jitter at some point in a packet's roundtrip path across a wireless communications network is employed so as to increase the variance in round trip times, without significantly increasing the average value thereof. Spurious TCP timeouts are avoided through the artificial delay injection which occurs at a network element along the communications path and without modification of, or requiring access to, the TCP protocol. Further, the injection of artificial delay is applied on a transaction-by-transaction basis. That is, the decision to inject, or not inject, the artificial delay as well as the value of the injected delay are applied to each TCP connection or TCP flow.

14 Claims, 6 Drawing Sheets

OTHER PUBLICATIONS

Leung, K.K., et al., "Methods to Improve TCP Throughput in Wireless Networks With High Delay Variability," Proceedings of IEEE Vehicular Technology Conference, 5 pages, Sep. 2004.

Ekström, H., et al., "The Peak-Hopper: A New End-to-End Retransmission Timer for Reliable Unicast Transport," 12 pages, IEEE INFOCOM 2004.

Yavuz, M. et al., "TCP over Wireless Links with Variable Bandwidth," IEEE, pp. 1322-1327, 2002.

Fu, S., et al., "Effect of Delay Spike on SCTP, TCP Reno, and Eifel in a Wireless Mobile Environment," IEEE, pp. 575-578, 2002.

Gurtov, A., "Effect of Delays on TCP Performance," 18 pages.

Gurtov, A., et al., "Responding to Spurious Timeouts in TCP," IEEE, pp. 2312-2322, 2003.

Gurtov, A., "Making TCP Robust Against Delay Spikes," University of Helsinki, Department of Computer Science, Report C-2001-53, 14 pages, Nov. 2001.

Gurtov, A., et al., "Multi-Layer Protocol Tracing in a GPRS Network," IEEE, pp. 1612-1616, 2002.

Korhonen, J., et al., "Measured Performance of GSM HSCSD and GPRS," IEEE, pp. 1330-1334, 2001.

Leung, K.K., et al., "Methods to Improve TCP Throughput in Wireless Networks With High Delay Variability," 5 pages.

Ludwig, R., et al., "The Eifel Algorithm: Making TCP Robust Against Spurious Retransmissions," Computer Communication Review, pp. 30-36.

* cited by examiner

METHOD AND APPARATUS FOR TIMEOUT REDUCTION AND IMPROVED WIRELESS NETWORK PERFORMANCE BY DELAY INJECTION

CROSS REFERENCE TO PROVISIONAL APPLICATION

This application claims the benefit of U.S. Provisional Application No. 60/629,223, filed on Nov. 18, 2004.

RELATED APPLICATION

The subject matter of the present application is related to that of U.S. patent application Ser. No. 09/665,724, filed Sep. 20, 2000, in the name of inventors J. Cloutier et al. and entitled "Improved Wireless Data Transmission Using Time Out Control", which is hereby incorporated by reference herein.

FIELD OF THE INVENTION

The present invention relates generally to wireless communications networks and, more specifically, to the avoidance of timeouts and improved throughput of such wireless networks.

BACKGROUND OF INVENTION

The Transmission Control Protocol (TCP) remains the most widely used transport control protocol across the Internet today. Although TCP was initially designed and optimized for wireline networks, such protocol is increasingly being used over wireless networks primarily due to the growing popularity of wireless data applications being offered by wireless service providers to their subscription base. The primary objective of TCP is to efficiently use the available bandwidth across the network and to prevent overloading the network (and the resulting packet losses) by appropriately throttling the sender's transmission rates. In conventional wireline TCP networks, network congestion is typically identified as the main underlying cause for packet losses.

In contrast, packet loss in wireless networks may occur for other reasons, for example, related to the time-varying nature of the wireless communications channel and the mobility of the end user. That is, as is well-known, channel fading and "dropped" calls as mobile subscribers move about (requiring handoffs between base stations supporting the wireless network) are common occurrences which contribute to the overall quality of service delivered by a wireless service provider. As a consequence of such variable packet loss circumstances in wireless networks, TCP may interpret such packet losses due to transmission errors, high latency and/or delay variability, as indications of network congestion. Unfortunately, this misdiagnosis of the root cause of packet losses will result in the TCP layer reducing the sender's transmission window and the initiation of well-known congestion control mechanisms (which are not required). As such, many wireless networks aim at avoiding packet losses at the TCP layer by implementing robust link layer protocols (e.g., using error control coding and robust link adaptation) as well as soft handoff and seamless mobility management algorithms. However, such solutions increase the packet transmission delay and its variability, and may have adverse effects on the TCP behavior.

In addition to the packet loss issues impacting TCP applications in wireless communications networks, so-called "delay spikes" affect the TCP through timeouts and throughput. As used herein, delay spikes are defined as a sudden and significant change in the round-trip time between a TCP sender and its TCP receiver. High delay variability has been observed in wireline networks and can be caused by so-called "route flipping" (see, M. Allman et al., "On Estimating End-to-End Network Path Properties", in *Proceedings of ACM SIGCOMM*, September 1999, which is hereby incorporated by reference herein). In wireless networks, the delay variability is attributable to several factors, most notably the time-varying quality of the wireless link (both the inherent variability and the variability induced by terminal mobility). Other contributors to delay variability in wireless networks include: (a) handoff delay caused when users are transferred between transmitting and/or receiving base stations; (b) transmission interruptions due to priority scheduling; and (c) preemptive service. In terms of the growth projections in wireless communications, transmission interruptions and service preemptions are becoming increasing important as wireless networks increasingly introduce multimedia applications thereby requiring efficient scheduling algorithms to maintain quality of service guarantees.

Thus, the observation and measurement of delay spikes has garnered particular attention and study, see for example, A. Gurtov et al., "Multi-layer Protocol Tracing in a GPRS Network", in *Proceedings of the IEEE Vehicular Technology Conference*, September 2002; J. Korhonen et al., "Measured Performance of GSM HSCSD and GPRS", in *Proceedings of the IEEE Conference on Communications*, June 2001; and M. Yavuz et al., "TCP Over Wireless Links with Variable Bandwidth", in *Proceedings of the IEEE Conference Vehicular Technology Conference*, September 2002, each of which is hereby incorporated by reference herein. The effects of large delays and delay variability on the behavior of TCP have been investigated, for example, in S. Fu et al., "Effect of Delay Spike on SCTP, TCP Reno and Eifel in a Wireless Mobile Environment", in *Proceedings of International Conference on Computer Communications and Networks*, October 2002; and A. Gurtov, "Effect of Delays on TCP Performance", in *Proceedings of IFIP Personal Wireless Communications*, August 2001, each of which is hereby incorporated by reference herein. Further, sudden increases in delay variability have been shown to lead to spurious TCP timeouts and the following undesirable responses: (a) TCP interprets a timeout as being caused by packet losses and unnecessarily retransmits the packets that are presumed lost; and (b) triggering of congestion control and a false reduction in the TCP window size, thereby contributing to lower throughput (see, R. Ludwig et al., "The Eifel Algorithm: Making TCP Robust Against Spurious Retransmissions", in *ACM Computer Communication Review*, volume 30, No. 1, January 2000, which is hereby incorporated by reference herein).

In view of such delay variability issues, several techniques have been proposed to alleviate their affect on TCP performance. For example, TCP Eifel (see Ludwig et al. supra.) has been proposed to detect spurious timeouts as well as spurious retransmits through the implementation of time stamping at both the sender and receiver. However, this technique requires an additional 12-byte overhead in the TCP header and has not yet been widely deployed. Other potential mitigation techniques for delay variability are described in A. Gurtov, "Making TCP Robust Against Delay Spikes", University of Helsinki, Department of Compute Science, Technical Report C-2001-53, November 2001, which is hereby incorporated by reference herein. These techniques include timing every transmitted segment (instead of timing a single segment per window of outstanding segments) and restarting the retransmit timer when a segment is retransmitted or upon reception of a duplicate acknowledgement.

Additional techniques are proposed in A. Gurtov et al., "Responding to Spurious Timeouts in TCP", in *Proceedings of IEEE INFOCOM*, March 2003, which is hereby incorporated by reference herein, and include enhancing the TCP Eifel for a more efficient operation in the presence of packet losses, appropriately restoring the congestion control mechanism and adapting the retransmit timer to avoid further spurious timeouts. While the above-described techniques provide for some level of alleviating the affect of delay variability on TCP performance, it is important to note that each of these solutions requires some degree of modification to the TCP protocol itself which may not be widely available. Further, these solutions do not attempt to avoid spurious timeouts but rather change the reaction of TCP when such timeouts occur. Moreover, some of the solutions, such as split-TCP solutions using proxy mechanisms, interfere with the end-to-end nature of the protocol paradigm. The end-to-end nature of the protocol is important to ensure reliable delivery of data from the source to the end-destination as well as for security reasons and end-to-end encryption of the data.

The above-cited U.S. patent application Ser. No. 09/665,724 discloses a wireless data transmission technique which employs the introduction of a delay into the communication channel so as to increase the deviation from the average in the channel delay thereby increasing the length of time required for a TCP timeout to occur. However, while this technique offers certain advantages and improvements in avoiding timeouts, an issue that still may arise is ensuring unobtrusive implementations in terms of TCP protocol access and interference with the TCP paradigm.

More particularly, the above-cited U.S. patent application Ser. No. 09/665,724 proposes to introduce the additional delay at either the mobile terminal or the mobile base station in an effort to minimize the number of spurious timeouts experienced by a TCP connection. In such an approach it will be noted that wireless networks run a series of different protocols, which are stacked onto each other in the well-known protocol stack. One of those layers is the transport layer at which TCP operates. TCP typically transmits data segments containing a certain amount of information bits. The communicating entities at the TCP layer are the TCP server (at the sending side) and the TCP receiver (at the receiver side). As will be well understood, these entities would typically correspond to mobile terminals, web servers, databases or file servers, to name just a few. Other well-known protocols operating at the layers below TCP, such as the Internet Protocol (IP), the Radio Link Protocol (RLP) or the Radio Link Control (RLC) protocol, fragment TCP segments into smaller data units (typically called frames) and operate between intermediate entities in the network, such as base stations, base station controllers, radio network controllers or mobile switching centers.

As such, these intermediate network entities do not necessarily have access to the TCP segments, but only to fragments of TCP segments. To illustrate this point, a base station or a base station controller may only have access to RLP frames and not to TCP segments. Therefore, if the additional delay is injected at the base station, it will affect RLP frames. Since TCP segments can have different lengths (depending on the application, the type of traffic—data or acknowledgment packets—or the capabilities of the intermediate routers in the IP network), the fragmentation of TCP segments to RLP frames potentially leads to a different number of RLP fragments per TCP segment. Hence, introducing delay at the base station may not lead to the desired delay when viewed at the TCP layer. In other words, the efficiency of the delay introduction depends on the level of fragmentation between the TCP and RLP protocols, which in itself depends on the type of data traffic and the TCP segment size. In addition, an application may not use TCP as a transport control mechanism but still may use RLP as a lower layer link protocol. In that case, the application does not experience spurious timeouts and therefore the corresponding traffic should not be subject to delay injection. However, if the delay injection is implemented at the RLP layer at the base station, the injection module cannot differentiate between RLP frames derived from TCP segments and RLP frames derived from other higher layer protocols such as UDP.

Further, the above-cited U.S. patent application Ser. No. 09/665,724 introduces delay to minimize the number of resulting spurious timeouts. However, the user-perceived performance, while dependent on the number of spurious timeouts, is not necessarily optimized when delay is introduced to minimize the number of timeouts. That is, the user-perceived throughput is a more direct measure of the performance and is better correlated with the user satisfaction. As is discussed in detail hereinbelow, this measure is one aspect to which the present invention is directed and on how the appropriate control parameters are chosen for obtaining optimized performance.

Therefore, it would be desirable to have a technique to eliminate the affect of delay variability (i.e., spurious TCP timeouts) on TCP behavior for optimized user-perceived performance and which is unobtrusive, does not require changes to the TCP protocol, and does not interfere with the end-to-end nature of the TCP protocol paradigm.

SUMMARY OF THE INVENTION

Accordingly, we have realized a technique which avoids spurious TCP timeouts through delay injection which requires no modification of, or requiring access to, the TCP protocol and is consistent with the TCP paradigm. Further, the delay injection is accomplished utilizing any network element along the communications path by operating on TCP packets exchanged across the path.

More particularly, the aspects of the present invention are directed to the injection of additional random delay or jitter (sometime alternatively referred to herein as "artificial delay", "injected delay" or "jitter") at some point in a packet's roundtrip path across a wireless communications network so as to increase the variance in so-called round-trip times (RTT), without significantly increasing the average value thereof. Importantly, in accordance with the principles of the invention, spurious TCP timeouts are reduced, or completely avoided and TCP throughput is increased, through the artificial delay injection without modification of, or requiring access to, the TCP protocol and in a manner, which is consistent with the TCP paradigm. Further, in accordance with an aspect of the invention, the injection of artificial delay is applied on a transaction-by-transaction basis. That is, the decision to inject, or not inject, the artificial delay as well as the value of the injected delay is applied to each TCP connection or TCP flow (i.e., the individual communication link between TCP sender and TCP receiver).

In accordance with the principles of the invention, the delay injection is accomplished by utilizing any network element (e.g., a router), along the communications path and by operating on TCP packets exchanged across the path. Therefore, the principles of the present invention provide increased control and flexibility over where in the communications network the delay is injected, and allow for delay injection directly at the TCP layer. For example, the network element for injecting delay, in accordance with the invention, may be an intermediary network element along the communications path situated between the ultimate endpoints of the communications link between the TCP sender and TCP receiver. At the network element implementing the delay injection mechanism, the different TCP flows are separated and treated individually and delay is injected according to specified injection parameters for each individual flow. This is particularly important since the TCP congestion control mechanism is applied on a per-flow basis and therefore each flow is subject to potential performance-degrading spurious timeouts. Applying the delay injection on the aggregate stream of packets may result in inappropriate delay injection for individual flows. In addition, different flows may experience different round-trip time statistics and different number of occurrences of spurious timeouts and therefore the appropriate delay injection parameters for optimized per-flow performance could potentially be different.

In accordance with an embodiment of the invention, the delay is injected into the transmission stream of packets across a network on a fixed time—fixed delay basis. That is, delay is injected on a fixed packet basis having fixed time (e.g., introduce a two second delay every fifth packet in the communications stream). In accordance with a further embodiment of the invention, delay is injected on a random time—fixed delay basis. That is, the additional delay is injected to every packet with a certain probability p. In accordance with a yet further embodiment of the invention, the delay is injected on a more fully random basis. That is, the delay injection occurs in a random fashion in terms of time and amount of delay.

These and other objects, features and advantages of the present invention will become apparent to those of ordinary skill in the art from the following detailed description of illustrative embodiments thereof, which is to be read in connection with the accompanying drawings.

DETAILED DESCRIPTION OF THE INVENTION

While TCP will be well understood by those of ordinary skill in the art, a brief discussion of certain TCP features will be introduced to allow for a better understanding of the various aspects, embodiments and advantages of the present invention. In particular, in order to detect packet or acknowledgement losses, TCP implements a timer which can be viewed as an upper bound on the round-trip time between the sender and the receiver. If an acknowledgement is not received before the timer expires, the corresponding packet is deemed to be lost, the congestion control mechanism is triggered and the packet is retransmitted. As such, the calculation of the timeout threshold is of critical importance (see, e.g., V. Jacobsen, "Congestion Avoidance and Control", in *Proceedings of ACM SIGCOMM*, 1988, which is hereby incorporated by reference herein). If we denote by RTT[k] the k-th measurement value of the round-trip time, it will be understood that (in most implementations) only one packet at any given time is tracked for the calculation of the timeout threshold. Of course, as will be understood, if the time-stamping option is enabled, it is possible to track the round-trip time of all packets.

Now, the round-trip time is calculated by a timer which is started when the packet is transmitted by the TCP sender and stopped when the acknowledgement for the same packet is received. S[k] denotes the so-called smooth average round-trip time (see, Jacobsen, supra) and is calculated as follows:

$$S[k]=(1-g)S[k-1]+g\text{RTT}[k], \text{ where } g \text{ is the smoothing factor with a typical value equal to } 1/8. \quad \text{EQ. (1)}$$

In addition, the variations of RTT can be tracked by calculating the mean deviation, as an approximation of the standard deviation, as follows (see, Jacobsen, supra):

$$V[k]=(1-h)V[k-1]+h|\text{RTT}[k]-S[k]|, \text{ where the gain } h \text{ has a typical value equal to } 1/4. \quad \text{EQ. (2)}$$

Further, the timeout threshold (RTO) is derived (see, Jacobsen, supra) as follows:

$$RTO[k]=S[k]+mV[k], \text{ where } m \text{ is typically equal to 4}. \quad \text{EQ. (3)}$$

Thus, after sending a packet, the TCP sender sets a timer with the RTO value (as derived in accordance with EQ. (3) hereinabove). A TCP timeout is declared if an acknowledgement for the corresponding packet is not received before the timer expires (i.e., if the RTT associated with the packet exceeds the RTO threshold). It is expected that this usually happens when a packet or the corresponding acknowledgement is lost. If the packet is indeed lost, then the timeout mechanism is required in order to avoid deadlock. On the other hand, if the packet is not lost, but merely delayed, the timeout mechanism is falsely triggered (i.e., a so-called spurious timeout). Such a spurious timeout would have been avoided if the RTO value had been larger. Thus, it will be readily understood that sudden and large changes in the round-trip time, i.e., so-called spike changes, can cause spurious timeouts and unnecessarily shut down the congestion window leading to unnecessary loss in TCP throughput.

As will be appreciated by those skilled in the art, several changes to the TCP protocol have been previously proposed to avoid spurious timeouts, such as implementing the time-stamping option (see, R. Ludwig et al., "The Eifel Algorithm: Making TCP Robust Against Spurious Retransmissions", in *ACM Computer Communication Review*, volume 30, No. 1, January 2000, which is hereby incorporated by reference herein) or changing the granularity of the TCP timer (see A. Gurtov et al., "Responding to Spurious Timeouts in TCP", in *Proceedings of IEEE INFOCOM*, March 2003, and P. Sarolahti et al., "Congestion Control in Linux TCP", in *Proceedings of the USENIX Annual Technical Conference*, June 2002, each of which is hereby incorporated by reference herein). Other proposed solutions are directed at making the RTO calculation more robust to delay spikes and include changing the smoothing parameters, i.e., the parameters g and h as shown in the above EQ. (1) and EQ. (2), (see H. Ekstrom et al., "The Peak-Hopper: A New End-to-End Retransmission Timer for Reliable Unicast Transport", in *Proceedings of IEEE INFOCOM*, March 2004, which is hereby incorporated by reference herein) and the weighting factor of the variance in the RTO calculation (i.e., the parameter m as shown in the above EQ. (3), see K. Leung et al., "Methods to Improve TCP Throughput in Wireless Networks with High Delay Variability", in *Proceedings of IEEE Vehicular Technology Conference VTC*, September 2004, which is hereby incorporated by reference herein. However, as mentioned previously, these proposed solutions require a change in the TCP protocol itself (including the related standard and de facto standards of the control parameters) and may not be widely and readily available.

In recognition of the above-described problems, the present Applicants have realized the aspects of the present invention directed to the injection of additional random delay at some point in a packet's round-trip path across a wireless communications network so as to increase the variance in RTT, without significantly increasing the average value thereof. Importantly, in accordance with the principles of the invention, spurious TCP timeouts are avoided through the artificial delay injection without modification of, or requiring access to, the TCP protocol and in a manner which is consistent with the TCP paradigm. Thus, it will be understood that the delay injection principles of the invention apply equally to any network element whether or not such network element has direct TCP access. That is, delay can be injected in accordance with the principles of the invention utilizing network elements having TCP access and those which do not have such direct access. In the case where direct TCP access is not available, the network element will, illustratively, infer boundaries of TCP packets utilizing data units at lower protocol layers (e.g., radio link protocol frames) and inject delay in accordance with the principles of the invention as if such network element had direct TCP access. Further, in accordance with an aspect of the invention, the injection of artificial delay is applied on a per TCP connection basis. That is, the decision to inject, or not inject, the artificial delay and the value of the injected delay are applied to each TCP connection or TCP flow (i.e., the individual communication link between TCP sender and TCP receiver).

Of course, the injection of the artificial delay in accordance with the invention presents certain important operational tradeoffs. That is, on one hand, reducing the number of spurious timeouts can potentially increase the throughput. On the other hand, injecting additional delay in the round-trip path increases the average RTT, which in return leads to a decrease in throughput. Nevertheless, as described in further detail hereinbelow, the present Applicants show that by applying the aspects of the present invention with the appropriate choice of the injected delay parameters, the net effect is an overall increase in TCP throughput along with a significant reduction in the number of timeout occurrences.

But first, however, the general methodology for the delay injection in accordance with the principles of the invention will be introduced. More particularly, in accordance with the invention, let D[k] represent the artificial delay to be injected for a particular measurement k (i.e., a tracked packet). Then the new value of RTT (used for calculation of S and V, and therefore RTO, see EQs. (1)-(3) hereinabove) is given by:

$$RTT_{new}[k] = RTT[k] + D[k] \qquad \text{EQ. (4)}$$

As such, the new timeout threshold value is calculated using EQs. (1)-(3) hereinabove in conjunction with the corresponding value of $RTT_{new}[k]$ as given by EQ. (4) hereinabove.

The artificial delay injection in accordance with the principles of the invention can occur in any number of ways to eliminate spurious timeouts. In accordance with a first embodiment of the invention, the delay is injected into the transmission stream of packets across a network on a fixed time—fixed delay basis (this first embodiment of the invention alternately referred to herein, for convenience, as "FTFD"). That is, a fixed delay is injected in accordance with a fixed schedule such that $D[k]=D_0$ whenever k=iN and D[k] =0 otherwise, where $D_0$ is the value of added delay and N is the period of the schedule. Therefore, in accordance with this embodiment of the invention, an additional delay of $D_0$ is added every N tracked packets.

In accordance with a second embodiment of the invention, delay is injected on a random time—fixed delay basis (this second embodiment of the invention alternately referred to herein, for convenience, as "RTFD"). That is, the additional delay is injected to every packet with a certain probability p. Thus, for every measurement k, $D[k]=D_0$ with probability p and D[k]=0 with probability 1−p. Note that by choosing p=1/N the average additional delay (averaged over all tracked packets) is the same for both the aforementioned FTFD and RTFD embodiments of the invention.

In accordance with a third embodiment of the invention, the delay is injected on a more fully random basis as compared with the aforementioned first and second embodiments of the invention (this third embodiment of the invention alternately referred to herein, for convenience, as "RTRD"). That is, the delay injection occurs as a function of making the time of the injection as well as the amount of additional delay random variables. In particular, let $f_D(d)$ represent a probability density function on the additional delay with mean $D_0$. Then with probability p, D[k]=d where d is chosen according the aforementioned density function (for example, exponential). Conversely, with probability 1−p, then D[k]=0.

As will be understood, the aforementioned FTFD, RTFD and RTRD embodiments of the invention are parameterized by different tunable parameters that are chosen (in part by monitoring the actual communications link) in order to obtain the optimal performance. In particular, two tunable parameters play an important role in the FTFD, RTFD and RTRD delay injection of the present invention and optimizing the performance of the particular delay injection mechanism. Such tunable parameters, which form a set of tunable parameters, are the delay injection probability p (or the delay injection period) and the value of the injected delay $D_0$ (or the value of the averages of such injected delay). The present Applicants have identified two possible methodologies for the selection of the set of tunable parameters for use in the application of delay injection in accordance with the principles of the invention which will now be discussed.

More particularly, a first methodology for determining the tunable operating parameters, for use in the application of delay injection in accordance with the principles of the invention, selects such parameters as function of a round-trip time threshold. That is, this parameter selection methodology attempts to ensure the probability that the round-trip time exceeds a particular threshold is not larger than a maximum acceptable value. For example, the round-trip time threshold could be set as the average value of the round-trip times plus four times the mean deviation of the round-trip times. Setting such a threshold may be attractive in that it corresponds to the same timeout threshold that is set by the TCP mechanism at the sender for determining timeout declarations. So, the probability that the actual round-trip times exceed the selected threshold might be set to one percent (1%), for example. In other words, the parameters for the delay injection in accordance with the invention are defined in such a way that the probability of the round-trip time between the sender and the receiver (including the injected delay) exceeds the mean value plus four times the mean deviation is not greater than one percent (1%). Thus, the tunable parameter set is selected so that the probability of a TCP timeout declaration is not greater than one percent (1%).

In accordance with this parameter selection approach, round-trip times in the network are collected (illustratively on a per-user basis or collectively for the entire network), such data collection focusing on different network scenarios (e.g., network loading conditions, user profiles, channel conditions and underlying applications) and performance improvement characteristics. Thus, the tunable parameters used for delay injection will be ultimately be selected as a function of a plurality of performance statistics collected from the communications network. The collected statistics of round-trip times include the probability density function of the round-trip times, their mean value and their variance and standard deviation. The statistics of the round-trip times are recollected, on some defined interval, to ensure optimal selection of the delay injection parameters in the event of some change in the overall statistics. Further, initial values for the delay injection parameters are selected, for example, both p and $D_0$ can be equal to zero which is indicative of the case in which the delay injection mechanism is not in use. After setting the initial parameters, one of the delay injection embodiments is selected (i.e., FTFD, RTFD and RTRD) and the corresponding statistics of the augmented round-trip times (defined as the measured round-trip times collected with injected delays) are computed. Such computed statistics include the probability density function of the round-trip times, the mean value and the standard deviation.

After such computation, a comparison is made between an acceptable threshold value and the probability that the augmented round-trip time exceeds such threshold. If the probability does not exceed the threshold, the chosen values of the tunable parameters (p and $D_0$) are kept and sent to the delay injection module for use in injecting delay in accordance with the principles of the invention. If, on the other hand, the probability does exceed the threshold, the chosen parameter values are discarded and reselected.

The second methodology for determining the values of the tunable operating parameters, for use in the application of delay injection in accordance with the principles of the invention, selects such parameters in terms of maximizing achieved TCP-level throughput. As in the first methodology, round-trip times are collected (as discussed above) together with the temporal correlation between the round-trip times. Once again, initial values for the delay injection parameters are selected (as discussed above) together with an initial value for the achievable throughput, and a selection of one of the delay injection embodiments (i.e., FTFD, RTFD and RTRD). Next, the achievable TCP throughput is computed (as will be well understood through computer simulations) as a function of the collected round-trip time statistics and the injection parameters. For the chosen set of parameters, the computed throughput value is compared with the selected initial value of achievable throughput and, if the computed throughput value is larger, such value replaces the initial throughput value together with the corresponding delay injection parameters. Such comparison is made on an iterative basis until such time that no further improvement in throughput is achievable (or the exhaustion of all possible combinations of the available set of injection parameters). Thereafter, the final set of delay injection parameters are utilized to inject delay in accordance with the present invention.

In accordance with the various aspects of the invention, the injection of artificial delay is applied on a transaction-by-transaction basis. That is, the decision to inject, or not inject, the artificial delay is applied to each TCP connection or TCP flow (i.e., the individual communication link between TCP sender and TCP receiver). Further, the injection of the artificial delay, in accordance with the invention, may occur in the traffic direction from the TCP sender to the TCP receiver or alternatively in the traffic direction from the TCP receiver to the TCP sender or in both directions.

Figure 1:
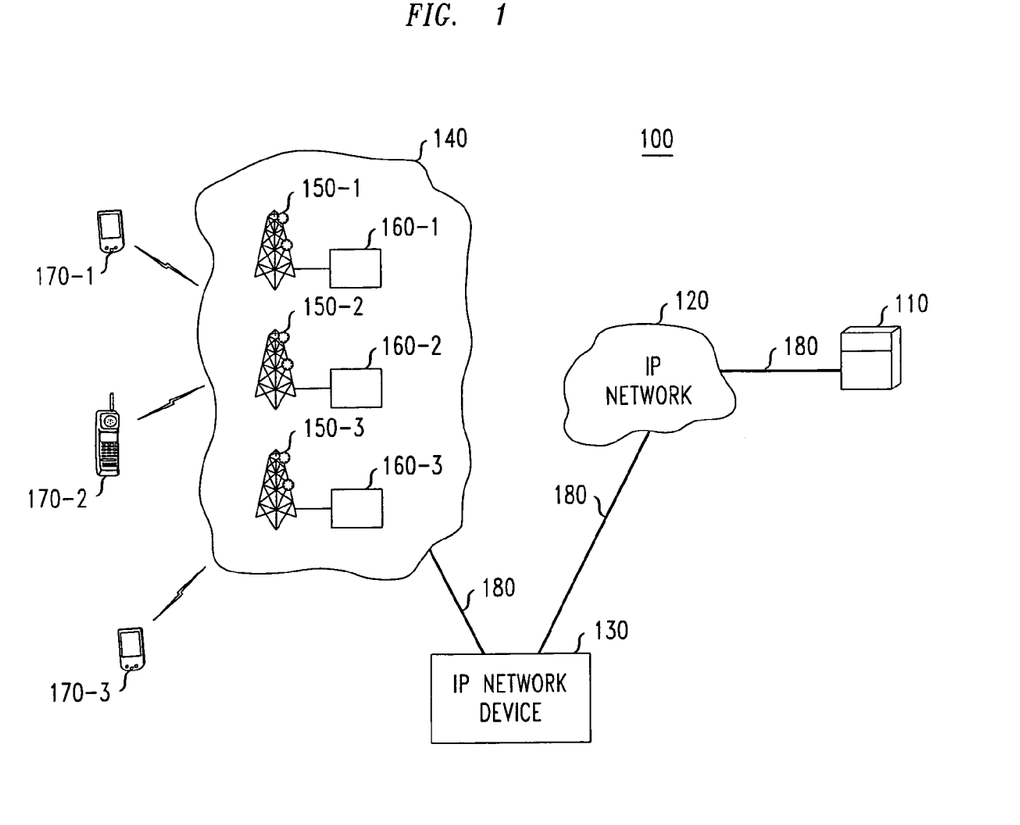
FIG. 1 shows an illustrative communications channel and network configuration in accordance with the principles of the invention.

FIG. 1 shows an illustrative communications channel and network configuration 100 in accordance with the principles of the invention. More particularly, the communications channel 180 extending through channel and network configuration 100 shown in FIG. 1 consists of TCP server 110 which may be any type of well-known server device which supports TCP applications, and which communicates through IP networks, for example, IP network 120. Of course, as will be appreciated, IP network 120 would have well-known components such as routers, servers, IP protocols, etc., such other components are not shown in FIG. 1 for clarity. Wireless communications network 140 (including well-known wireless base stations 150-1 through 150-3, and wireless base station controllers 160-1 through 160-3) communicates, in a conventional manner, with IP network 120 through IP network device 130. For example, IP network device 130, as adapted to implement the aspects of the present invention (see FIG. 2, and as discussed further below), could be of the type any well-known packet data serving node (PDSN) which provides access to the Internet/intranets and applications servers for wireless base stations (for example, wireless base station 150-1). Essentially, the PDSN provides IP and mobile IP access and packet transport capabilities, and serves as a gateway to the IP network (for example, IP network 120) for mobile stations (for example, mobile stations 170-1 through 170-3).

Figure 2:
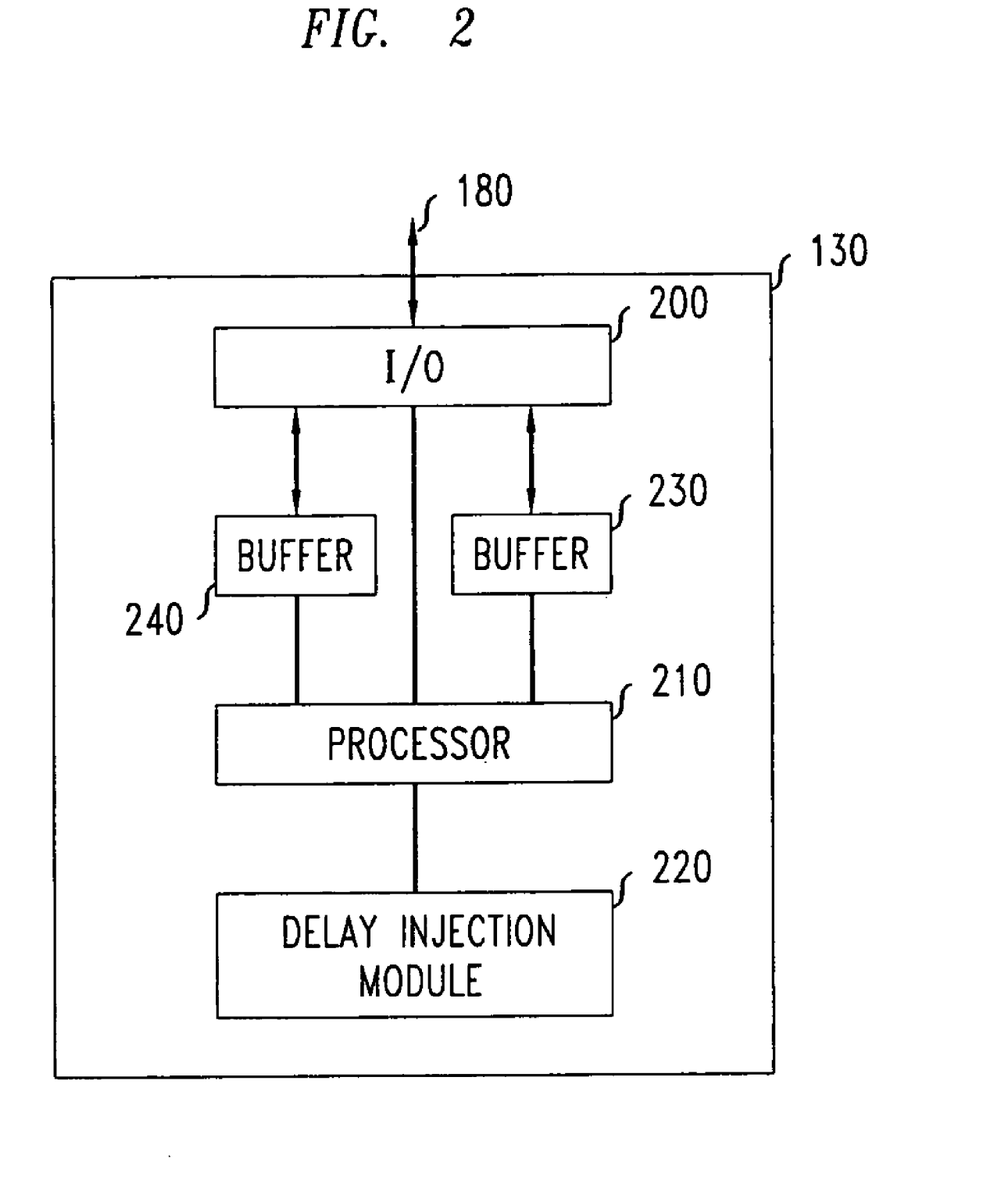
FIG. 2 shows a functional block diagram of an illustrative IP network device, as illustratively depicted in FIG. 1, configured in accordance with the principles of the invention.

Focusing further for a moment on IP network device 130, FIG. 2 shows a functional block diagram of an illustrative IP network device, as also depicted in FIG. 1, configured in accordance with the principles of the invention. In particular, as shown in FIG. 2, IP network device 130 has an input/output module 200 for managing incoming/outgoing communications from the device over communications channel 180. Processor 210 in addition to providing conventional operational control is adapted to implement the artificial delay injection, in accordance with principles of the invention as discussed above, in conjunction with delay injection module 220 and buffer 230 and/or buffer 240. In particular, delay injection module 220 will have software modules/programs which, when executed in a conventional manner, implement the various embodiments of the invention (i.e., the aforementioned FTFD, RTFD and RTRD). As will be appreciated, in a typical TCP application, one will have a data traffic path and an acknowledgement path across the TCP link (e.g., communications channel 180). In accordance with the present invention, the injection of the artificial delay, as described herein, may occur in either path.

In applying the FTFD, RTFD and RTRD embodiments, there are two preferred implementations of the delay injection mechanism which apply equally to the various embodiments of the invention. The first implementation delays only the selected packets for the appropriate delay but allows other subsequent packets to flow through on the communication channel without any additional delay. The second implementation delays all subsequent packets once it has been decided to delay a particular packet. Thus, the first packet is delayed by the chosen amount of time, but subsequent packets are delayed until the first packet proceeds on the communication channel. In other words, subsequent packets experience variable delay depending on their relative arrival time to the buffer with respect to the arrival time of the selected packet.

For example, in accordance with the invention, IP network device 130 monitors communications channel 180 (i.e., a TCP link) whereby mobile station 170-1 hosts a TCP application that exchanges information (via a plurality of packet exchanges) with TCP server 110. In the course of monitoring communications channel 180, IP network device 130 determines that delay injection is necessary. As mentioned above, the injection of the artificial delay, in accordance with the invention, may occur in the direction from the TCP sender to the TCP receiver or in the direction from the TCP receiver to the TCP sender. In the current example, IP network device 130 inserts delay using the uplink in which mobile station 170-1 transmits TCP acknowledgement messages (i.e. packets) in response to received data packets from TCP server 110. For example, the user of mobile station 170-1 may be requesting news information (via a web browser application executing on such station) from a web server (i.e., TCP server 110) associated with a well-known news website (e.g., www.CNN.com or www.MSNBC.MSN.com). As such, IP network device 130 will add delay using buffer 240 to delay acknowledgement messages sent from mobile station 170-1 to TCP server 110. Alternatively, if the delay injection were to occur on the downlink, buffer 230 would be utilized by IP network device 130 to insert the delay in data packets being transmitted between TCP server 110 and mobile station 170-1. Illustratively, in accordance with the FTFD embodiment of the invention, a two second delay is injected every fifth packet. It will be noted that while the above discussion and example illustrates the principles of the invention in terms of IP network device 130, the artificial delay injection mechanism may also be delivered by wireless base station 150-1, wireless controller 160-1, the IP network 120 itself, and/or any TCP-enabled network entity situated between the TCP sender and TCP receiver.

It is to be appreciated that the term "processor" as used herein is intended to include any processing device, such as, for example, one that includes a central processing unit (CPU) and/or other processing circuitry (e.g., digital signal processor (DSP), microprocessor, etc.) Additionally, it is to be understood that the term "processor" may refer to more than one processing device, and that various elements associated with a processing device may be shared by other processing devices. It will also be appreciated that the aforementioned delay injection module may include a memory device, as used herein "memory" is intended to include memory and other computer-readable media associated with a processor or CPU, such as, for example, random access memory (RAM), read only memory (ROM), fixed storage media (e.g., a hard drive), removable storage media (e.g., diskette), flash memory, and the like.

To further illustrate the principles and advantageous features of the invention, the present Applicants performed certain real-world tests of a wireless communications network. In conducting such tests, ping tests with a pre-specified payload size were conducted on an actual, commercial GPRS network and the round-trip times between the mobile terminal and a target router were recorded. The tests were conducted with the assumption that the mobile user was stationary and during light network loading conditions. The target router in the GPRS network was identified using the well-known tracert utility and chosen to be the first router recorded in the tracert list. As will be appreciated, such a selection minimizes the contribution of the backhaul network to the round-trip time recorded for the pings. Consequently, the major part of the recorded RTT is due to the limited data rate on the air interface and the dynamic assignment of radio resources to the data flow. In the Applicants' tests, the ping utility issues 10,000 messages and waits for a maximum of 10 seconds for the associated reply message. Upon receipt of the reply, or the expiration of such maximum wait time, the next ping request message is sent. When a reply is received, the ping utility displays a statistics report which includes the RTT for the corresponding ping message. It should be noted that the collected measurements, as discussed in more detail hereinbelow, in the GPRS network show that the average RTT is on the order of 500 msec. Future wireless data networks are expected to have round trip times that are significantly smaller (for example, on the order of 100 msec). Therefore, in conducting the aforementioned tests, the present Applicants scaled all the measurements by a factor of five (5), the results of such tests will now be discussed in greater detail.

Figure 3A:
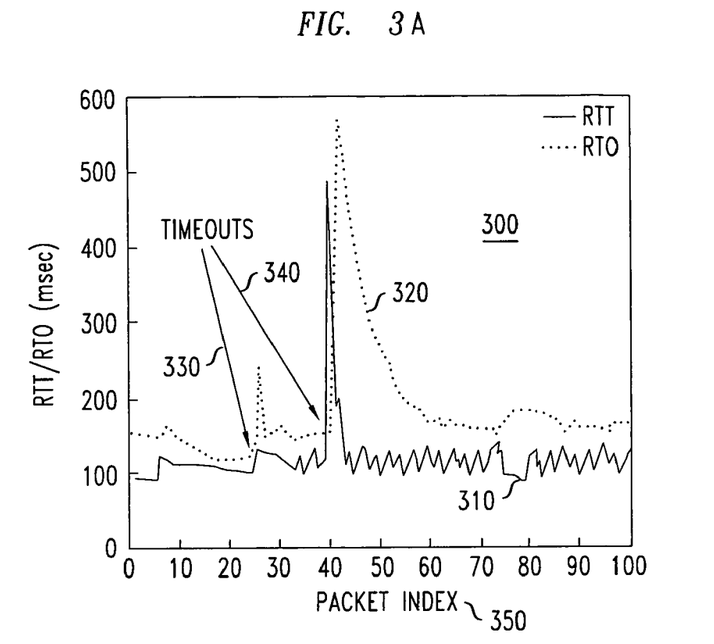
FIG. 3A shows a graph of results obtained in measuring RTT and RTO, without application of delay injection in accordance with the principles of the invention, in a wireless communications network.

More particularly, FIG. 3A shows a graph of results 300 obtained in measuring RTT and RTO, without application of delay injection in accordance with the principles of the invention, in a wireless communications network (in particular, an actual commercial GPRS network). In FIG. 3A, RTT measurements 310 are shown for 0-byte ping packets, as well as the associated RTO estimate 320 (as calculated in accordance with EQ. (3) hereinabove). A timeout is declared (see, for example, timeouts 330 and 340, respectively) if the RTT measurement exceeds the RTO threshold for that packet. In terms of FIG. 3A, a window of 100 consecutive samples are shown which resulted in two timeout occurrences: (a) timeout 330 associated with packet number 25 (see packet index 350 across x-axis); and (b) timeout 340 associated with packet number 40. So, such results serve to demonstrate the presence of delay spikes, even in the scenario where the mobile user is stationary (and therefore the channel variations are limited and there are no mobility-induced handoffs) and the network is lightly loaded. As will be appreciated, the occurrence of such delay spikes would be expected to increase in scenarios where the mobile user is non-stationary and the network load is increased.

Furthermore, since no packets were lost during Applicants' various tests, these timeouts are spurious and attributed to the large RTT spikes observed. Since the ping packets are only sent upon reception of the previous reply message, the RTT measurements turn out to be essentially uncorrelated and the timeouts are observed as isolated incidents. If ping packets are sent successively without waiting for the corresponding replies, the RTT measurements may be better correlated and delay spikes are expected to be observed in bursts. The impact of a burst of delay spikes may depend upon the TCP implementation and, in particular, on the retransmission mechanism invoked upon observing a timeout. Therefore, it is expected that performance gains achieved through applying delay injection in accordance with the principles of the invention may also depend on the particular retransmission mechanism, however, it will be noted that the principles of the invention do not require any awareness of retransmission strategy.

Figure 3B:
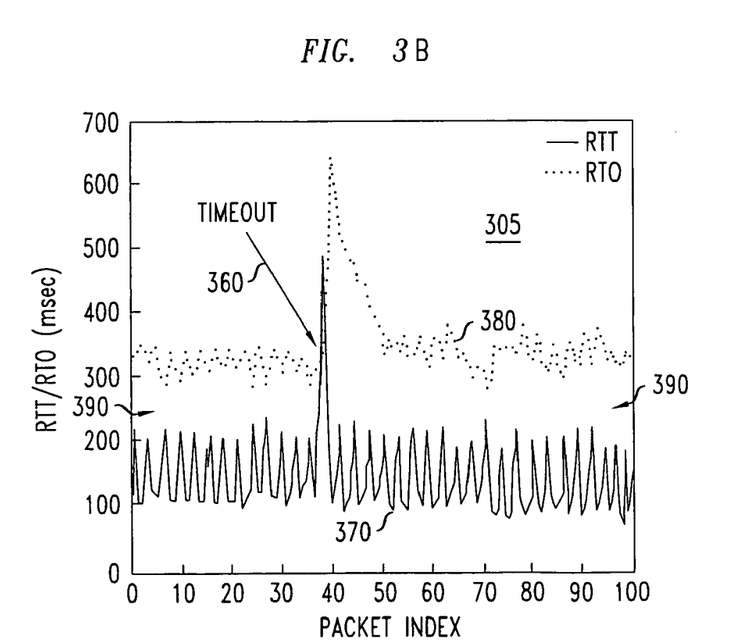
FIG. 3B shows a graph of results illustrating the effects of applying delay injection in accordance with the principles of the invention to the wireless communications network of FIG. 3A.
Figure 4A:
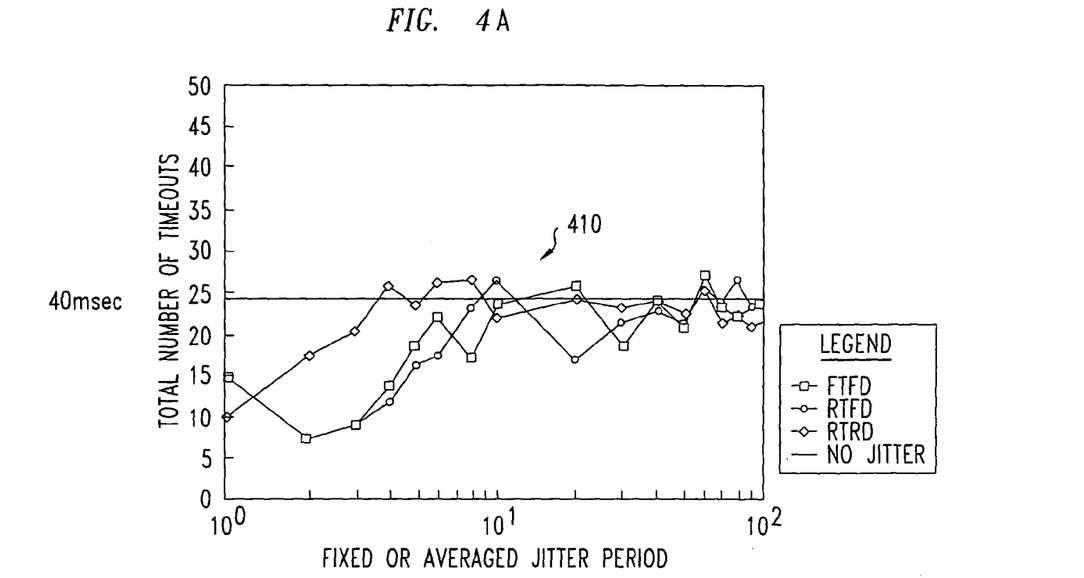
FIGS. 4A-4D show simulation results of the number of TCP timeouts after delay injection in accordance with various embodiments of the present invention.
Figure 4B:
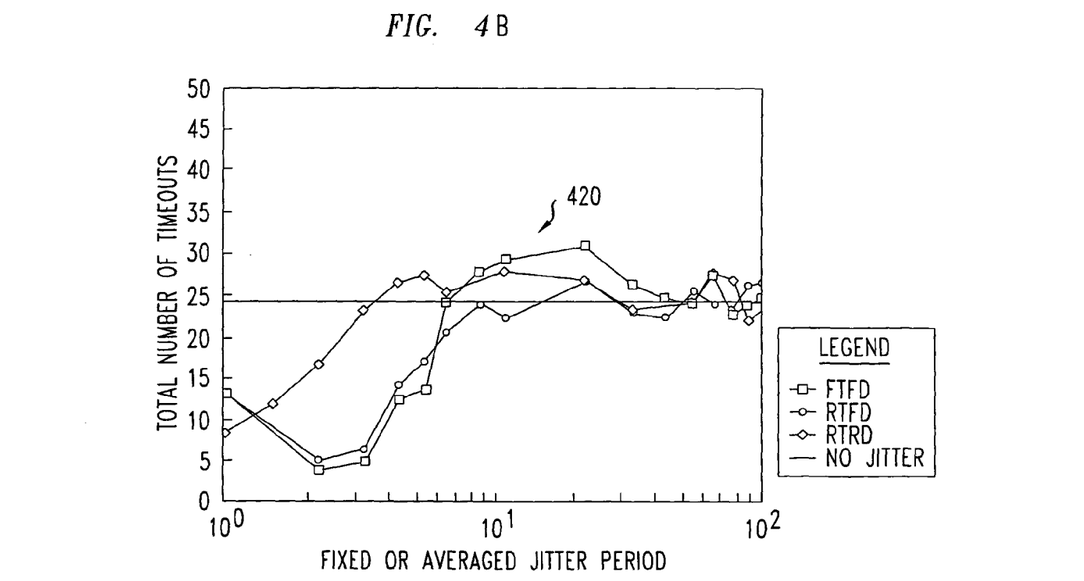
Figure 4C:
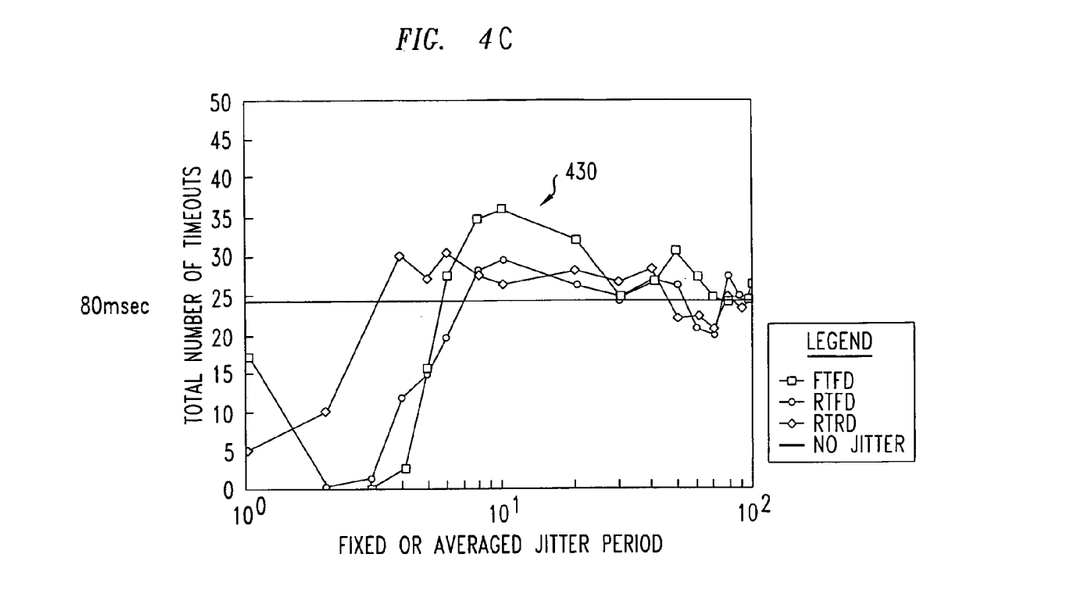
Figure 4D:
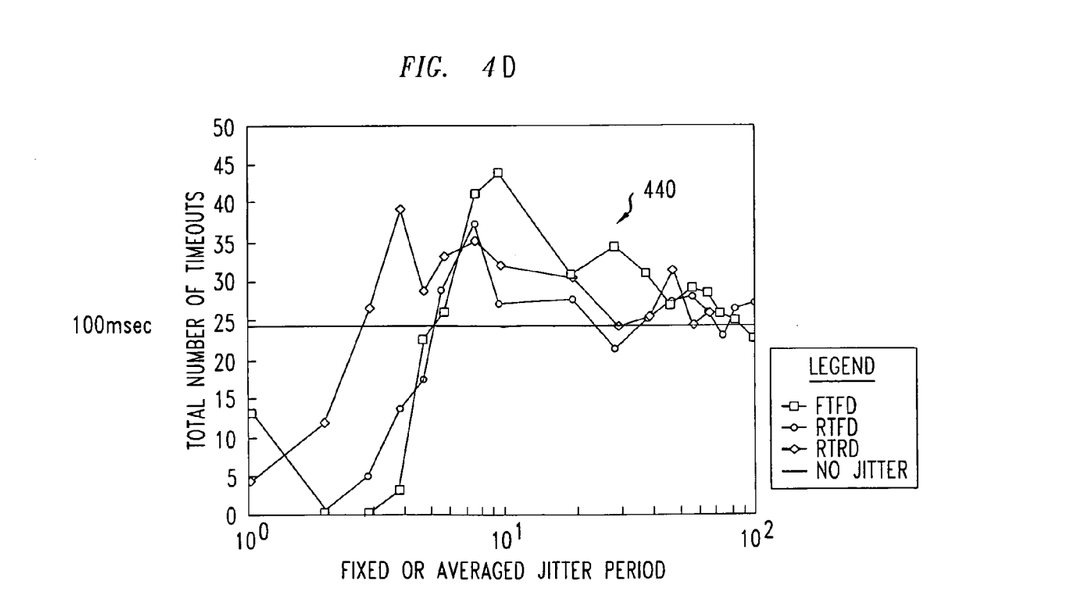

As noted above, FIG. 3A shows RTT/RTO and timeout results observed in the GPRS network without application of the present invention. The discussion herein is now turned to results obtained in applying the principles of the invention, in particular, in applying the above-detailed FTFD, RTFD and RTRD embodiments of the invention. The Applicants first studied the application of the FTFD embodiment of the invention to the vector of collected RTT measurement as collected from the GPRS network of FIG. 3A. In view of the Applicants' observations that the FTFD embodiment (as detailed below) results in the greatest reduction in the number of timeouts, such embodiment is the preferred embodiment of the invention in terms of overall timeout reduction. In particular, the new RTO threshold was again computed in accordance with EQ. (3) hereinabove. FIG. 3B shows a graph 305 of results illustrating the effects of applying delay injection in accordance with the principles of the invention to the wireless communications network of FIG. 3A. In applying the FTFD embodiment of the invention to show the effect the RTT measurements on RTO estimates, we selected $D_0$=100 msec and N=3, the rationale for such selections is discussed in greater detail hereinbelow.

As shown in FIG. 3B, one of the previous timeouts recorded (i.e., timeout 330 as shown in FIG. 3A) has been avoided by applying the FTFD embodiment of the invention. However, the second timeout (i.e., timeout 340 as shown in FIG. 3A) could not be avoided (i.e., see timeout 360 in FIG. 3B) as the experienced delay spike was too large. In general, as seen from the results in FIG. 3B, margin 390 between RTO 380 and RTT 370 is substantially increased, when compared to the results of graph 300 (in particular, the smaller margin between RTT 310 and RTO 320, as shown in FIG. 3A). Therefore, in applying the principles of the invention, an increase in the robustness to delay variations is realized.

As discussed above, the delay injection principles of the present invention will, advantageously, serve to mitigate spurious timeouts over a TCP link. To further illustrate the various aspects of the invention and advantages thereof, the present Applicants assessed the impact of their delay injection technique in terms of its impact on TCP performance. In particular, the Applicants assembled a complete TCP simulator which captured the feedback, congestion control and timeout mechanisms associated with a TCP link. The simulator was implemented with "selective repeat" as the retransmission policy with the time stamping option disabled. In the simulations, four different values for the amount of delay injected were considered, in particular, $D_0$=40, 60, 80 and 100 msec, and for each such $D_0$ value the jitter period varied. The results of the simulations are shown in FIGS. 4A through 4D.

More particularly, FIGS. 4A-4D show graphical results 410, 420, 430 and 440, respectively, wherein such results show the average number of TCP timeouts in applying the above-detailed FTFD, RTFD and RTRD embodiments of the invention and without (identified as "no jitter" as shown in the various FIGS. 4A-4D) applying the principles of the invention during ten (10) independently performed experiments of an FTP-like transfer of 512 segments of 500 bytes each. Several important conclusions can be drawn from the results shown in FIGS. 4A through 4D. First and foremost, it will observed that the application of the various embodiments of the invention can indeed reduce the number of TCP timeouts and that the selection of the parameters will affect performance. For example, as will be appreciated from the results of the Figures, the best performance in terms of avoiding TCP timeouts is achieved when $D_0$=100 msec and N=3, which reduced the average number of timeouts from 24 to 0.1.

The above-described tests, simulations and related results clearly show the advantages of the present invention in terms of avoiding TCP timeouts. However, in addition to such TCP timeout reductions, a further important communications characteristic is related to throughput. As such, the various aspects and advantages of the present invention will now be discussed in terms of overall throughput improvement achieved. In particular, from the above discussion and results, it can be shown that the application of the present invention leads to a slight increase in the average RTT, which is equal to $pD_0/W$ (where p is the delay injection probability, $D_0$ is the average injected delay, and W is the average window size). The average window size is derived from the fact that the delay is potentially only injected to packets that are tracked for RTO calculation (i.e., at most one packet per window of outstanding packets). This small increase in average RTT negatively affects the throughput performance, since the TCP throughput can be approximated as the ratio of the average window size to the average RTT. In the absence of timeouts, the delay injection in accordance with the present invention would not provide any throughput gain. However, the presence of delay spikes causes spurious timeouts which unnecessarily reduce throughput.

Figure 5:
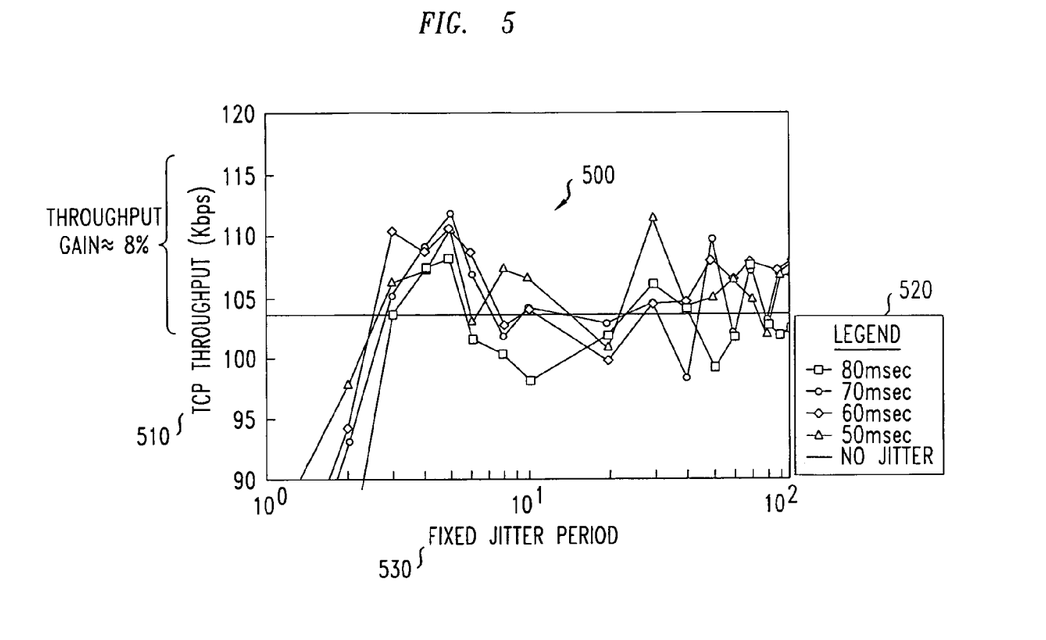
FIG. 5 shows a graph of simulation results illustrating the achieved TCP throughput as a function of jitter period for different values of injected delays in accordance with the preferred embodiment of the invention.

In the following discussion, Applicants show that an increase in RTT, in applying the delay injection in accordance with the principles of the invention, is offset by a reduction of timeouts and the net effect thereby being an increased throughput. More particularly, FIG. 5 shows a graph of simulation results 500 illustrating the achieved TCP throughput 510 as a function of jitter period 530 for different values of injected delays 520. As shown in FIG. 5, the achieved TCP throughput without any delay injection is 103.58 kbps, and the maximum throughput of 111.96 kbps is achieved in applying and injecting delay in accordance with the preferred embodiment of the invention (i.e., the FTFD embodiment of the invention). Thus, in applying the FTFD preferred embodiment of the invention (with $D_0$=70 msec and N=5) a throughput improvement of approximately 8% is achieved. It will be noted that the set of parameters that minimizes the number of timeouts in the simulation shown in FIG. 5 is achieved with $D_0$=100 msec and N=3 results in a throughput of 101.20 kbps (not shown in FIG. 5). Thus, it is interesting to observe from such simulation results that minimizing the number of timeouts may not necessarily maximize the achieved TCP throughput. In other words, to eliminate virtually all timeouts, the average injected delay needs to be fairly large in order to make the timeout threshold more robust to delay spikes. However, the required delay value results in an overall degradation in throughput. One possible explanation, as observed by Applicants in conducting this simulation, is that TCP timeouts tend to occur in bursts and, therefore, such timeouts do not have the same affect on TCP throughput (in view of the fact that the congestion window remains small for subsequent timeouts after the initial timeout in the same burst). Nevertheless, the aforementioned simulation results 500, do confirm that application of delay injection in accordance with the principles of the invention will alleviate the deleterious effect of delay spikes, reduce the number of spurious timeouts, and provide throughput gains. Further, advantageously, such improvements are achieved without requiring any modification of, or access to, the TCP protocol.

The foregoing merely illustrates the principles of the invention. It will thus be appreciated that those skilled in the art will be able to devise various arrangements which, although not explicitly described or shown herein, embody the principles of the invention and are within its spirit and scope. For example, one skilled in the art, in light of the descriptions of the various embodiments herein, will recognize that the principles of the present invention may be utilized in widely disparate fields and applications. All examples and conditional language recited herein are intended expressly to be only for pedagogical purposes to aid the reader in understanding the principles of the invention and are to be construed as being without limitation to such specifically recited examples and conditions. Moreover, all statements herein reciting aspects and embodiments of the invention, as well as specific examples thereof, are intended to encompass functional equivalents thereof.

Further, the invention can also be embodied in the form of program code embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. The invention can also be embodied in the form of program code, for example, in a storage medium, loaded into and/or executed by a machine, or transmitted over some transmission medium, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits.

We claim:

1. A method for reducing timeouts across a communications network, said communications network having a plurality of communications links which exchange packets in accordance with a transmission control protocol (TCP) having a timeout mechanism triggered by round-trip packet delays that exceed a threshold, RTO, that is adapted based on measured packet round-trip times, said method comprising the steps of:

monitoring said packets exchanged across a particular one communications link of said plurality of communications links, said one communications link connecting a TCP receiver and a TCP sender;

injecting, at a network element along said communications link, a delay into said TCP packets being exchanged across said communications link, said delay being injected at a fixed time interval and having a fixed length;

selecting a set of tunable parameters comprising at least said delay injection time interval and a value $D_0$ of said injected delay length, said parameter selection being made so as to increase RTO by an amount effective to reduce the likelihood of TCP timeouts experienced by said TCP sender and TCP receiver on said monitored communications link while increasing an achieved TCP-level throughput;

wherein the delay injecting is made as a function of the selected delay injection time interval and the selected value $D_0$ of injected delay length; and wherein said delay injecting occurs without modification of said TCP protocol.

2. The method of claim 1, wherein said packets are acknowledgement packets transmitted from said TCP receiver to said TCP sender.

3. The method of claim 2, wherein said communications network is a wireless network, said TCP receiver is a wireless handset and said TCP sender is a server.

4. A method for reducing timeouts across a communications network, said communications network having a plurality of communications links which exchange packets in accordance with a transmission control protocol (TCP) having a timeout mechanism triggered by round-trip packet delays that exceed a threshold, RTO, that is adapted based on measured packet round-trip times, said method comprising the steps of:

monitoring said packets exchanged across a particular one communications link of said plurality of communications links, said one communications link connecting a TCP receiver and TCP sender;

injecting, at a network element along said communications link, a delay into said TCP packets being exchanged across said communications link, said delay being injected at a random time interval and having a fixed length;

selecting a set of tunable parameters comprising at least a delay injection probability and a value $D_0$ of said injected delay length, said parameter selection being made so as to increase RTO by an amount effective to reduce the likelihood of TCP timeouts experienced by said TCP sender and TCP receiver on said monitored communications link while increasing an achieved TCP-level throughput; and wherein the delay injecting is made as a function of the selected delay injection probability and the selected value $D_0$ of injected delay length; and wherein said delay injecting occurs without modification of said TCP protocol.

5. The method of claim 4, wherein said packets are acknowledgement packets transmitted from said TCP receiver to said TCP sender.

6. The method of claim 5, wherein said communications network is a wireless network, said TCP receiver is a wireless handset and said TCP sender is a server.

7. A method for reducing timeouts across a communications network, said communications network having a plurality of communications links which exchange packets in accordance with a transmission control protocol (TCP) having a timeout mechanism triggered by round-trip packet delays that exceed a threshold, RTO, that is adapted based on measured packet round-trip times, said method comprising the steps of:

monitoring said packets exchanged across a particular one communications link of said plurality of communications links, said one communications link connecting a TCP receiver and a TCP sender;

injecting, at a network element along said communications link, a delay into said TCP packets being exchanged across said communications link, said delay being injected at a random time interval and having a random length;

selecting a set of tunable parameters comprising at least a delay injection probability and a mean value of an injected delay length, said parameter selection being made so as to increase RTO by an amount effective to reduce the likelihood of TCP timeouts experienced by said TCP sender and TCP receiver on said monitored communications link while increasing an achieved TCP-level throughput;

wherein the delay injecting is made as a function of the selected delay injection probability and mean injected delay length; and wherein said delay injecting occurs without modification of said TCP protocol.

8. The method of claim 7, wherein said packets are acknowledgement packets transmitted from said TCP receiver to said TCP sender.

9. The method of claim 8, wherein said communications network is a wireless network, said TCP receiver is a wireless handset and said TCP sender is a server.

10. A transmission control protocol (TCP) network apparatus comprising:

a processor;

at least one memory coupled to said processor; and wherein said processor is operative to perform the steps of:

monitoring a plurality of packets exchanged across a particular one TCP communications link of a plurality of TCP communications links, said one communications link connecting a TCP receiver and a TCP sender;

injecting a delay into said packets being exchanged across said TCP communications link, such that said delay injecting occurs without modification of a TCP protocol that governs said packets exchanged across said TCP communications link and that has a timeout mechanism triggered by round-trip packet delays that exceed a threshold, RTO, that is adapted based on measured packet round-trip times, and selecting a set of tunable parameters that control an average delay injection time interval and an average value of injected delay length, said parameter selection being made so as to increase RTO by an amount effective to reduce the likelihood of TCP timeouts experienced by said TCP sender and TCP receiver on said monitored communications link while increasing an achieved TCP-level throughput across in a communications network supporting said TCP communications link and connected with said TCP network apparatus.

11. The TCP network apparatus of claim 10, wherein said delay is injected at a fixed time interval and having a fixed length.

12. The TCP network apparatus of claim 10, wherein said delay is injected at a random time interval and having a fixed length.

13. The TCP network apparatus of claim 10, wherein said delay being injected at a random time interval and having a random length.

14. An article of manufacture comprising a non-transitory machine-readable medium storing one or more programs for use in reducing timeouts across a communications network, said communications network having a plurality of communications links which exchange packets in accordance with a transmission control protocol (TCP) having a timeout mechanism triggered by round-trip packet delays that exceed a threshold, RTO, that is adapted based on measured packet round-trip times, said one or more programs when executed performing the steps of:

monitoring said packets exchanged across a particular one communications link of said plurality of communications links, said one communications link connecting a TCP receiver and a TCP sender;

injecting a delay, at a network element connected along said communications link at an intermediary point between said TCP receiver and said TCP sender, into said TCP packets being exchanged across said communications link at a predefined interval, and selecting a set of tunable parameters that control an average delay injection time interval and an average value of injected delay length, said parameter selection being made so as to increase RTO by an amount effective to reduce the likelihood of TCP timeouts experienced by said TCP sender and TCP receiver on said monitored communications link while increasing an achieved TCP-level throughput;

wherein said delay injecting occurs without modification of said TCP protocol.

\* \* \* \* \*